United States Patent
Powell

(10) Patent No.: US 9,436,980 B2
(45) Date of Patent: Sep. 6, 2016

(54) REDUCING GHOSTING AND OTHER IMAGE ARTIFACTS IN A WEDGE-BASED IMAGING SYSTEM

(71) Applicant: Microsoft Corporation, Redmond, WA (US)

(72) Inventor: Karlton Powell, Lake Stevens, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 475 days.

(21) Appl. No.: 13/648,281

(22) Filed: Oct. 10, 2012

(65) Prior Publication Data

US 2014/0098245 A1   Apr. 10, 2014

(51) Int. Cl.
*H04N 5/228* (2006.01)
*G06T 5/00* (2006.01)
*H04N 5/359* (2011.01)
*H04N 5/357* (2011.01)

(52) U.S. Cl.
CPC .............. *G06T 5/003* (2013.01); *G06T 5/006* (2013.01); *H04N 5/357* (2013.01); *H04N 5/3597* (2013.01)

(58) Field of Classification Search
CPC ........................... H04N 5/357; H04N 5/3597
USPC .......................................................... 348/241
See application file for complete search history.

(56) References Cited

U.S. PATENT DOCUMENTS

| | | | |
|---|---|---|---|
| 5,153,926 A * | 10/1992 | Jansson et al. | 382/128 |
| 6,452,635 B1 * | 9/2002 | Tanaka | 348/342 |
| 6,829,393 B2 * | 12/2004 | Jansson | 382/275 |
| 7,120,309 B2 | 10/2006 | Garcia | |

(Continued)

FOREIGN PATENT DOCUMENTS

EP   1708136 A1   10/2006

OTHER PUBLICATIONS

Vicidomini, et al., "Automatic deconvolution in 4Pi-microscopy with variable phase", Retrieved at <<http://www.mpibpc.mpg.de/groups/hell/publications/pdf/Opt._Exp._18_8_10154-10167.pdf>>, In Journal of Optics Express, vol. 18, Issue 10, Apr. 12, 2010, pp. 14.

(Continued)

*Primary Examiner* — Ngoc-Yen Vu
(74) *Attorney, Agent, or Firm* — Brandon Roper; Fehmi Chebil; Micky Minhas

(57) ABSTRACT

A computational image processing filter processes an image from a wedge-based imaging system so as to remove artifacts such as blurring and ghost images. By removing the artifacts computationally instead of optically, manufacturing costs and complexity are reduced over prior solutions. In one implementation, the computational image processing filter performs a two-dimensional transform to align a ghost image with a pixel grid defined by the wedge. The transformed image is then stretched using a nonlinear transform to make the ghost pitch versus position a constant. Next, an anti-ghost point spread filter is created and deconvolved. Finally, an inverse of the nonlinear mapping is applied. Artifacts introduced by other optical layers can be reduced by deconvolving the artifact from the image according to a point-spread function representing an effect of the optical layers on the image.

25 Claims, 10 Drawing Sheets

(56) References Cited

U.S. PATENT DOCUMENTS

| | | | | |
|---|---|---|---|---|
| 7,362,895 | B2* | 4/2008 | Masumura | H04N 5/217 348/E5.078 |
| 7,499,166 | B2 | 3/2009 | Albertson et al. | |
| 7,545,429 | B2* | 6/2009 | Travis | 348/335 |
| 7,656,583 | B2 | 2/2010 | Goelles et al. | |
| 7,660,477 | B2* | 2/2010 | Wales | G09G 3/20 345/647 |
| 7,755,703 | B2* | 7/2010 | Ogawa et al. | 348/614 |
| 8,396,320 | B2* | 3/2013 | Allebach et al. | 382/274 |
| 8,400,713 | B2* | 3/2013 | Grasser | 359/489.09 |
| 8,463,073 | B2* | 6/2013 | Ma et al. | 382/289 |
| 2005/0254724 | A1* | 11/2005 | Seesselberg et al. | 382/274 |
| 2008/0298719 | A1* | 12/2008 | Sengupta | G06K 9/32 382/294 |
| 2010/0265466 | A1 | 10/2010 | Lescure et al. | |
| 2010/0283871 | A1* | 11/2010 | Ishida | 348/241 |
| 2013/0271615 | A1* | 10/2013 | Webster | H04N 5/211 348/208.4 |
| 2015/0042829 | A1* | 2/2015 | McCloskey | G06T 5/003 348/208.5 |
| 2015/0276957 | A1* | 10/2015 | Caprioli | G01V 1/364 367/7 |

OTHER PUBLICATIONS

Joshi, et al., "PSF Estimation using Sharp Edge Prediction", Retrieved at <<http://vision.ucsd.edu/kriegman-grp/research/psf_estimation/psf_estimation.pdf>>, In proceeding of 2008 IEEE Computer Society Conference on Computer Vision and Pattern Recognition (CVPR 2008), Jun. 24, 2008, pp. 8.

Travis, et al., "Wedge Optics in Flat Panel Displays", Retrieved at <<http://ieeexplore.ieee.org/stamp/stamp.jsp?tp=&arnumber=6134629>>, In proceedings of IEEE, Jan. 18, 2012, pp. 16.

Yingen Xiong, "Eliminating Ghosting Artifacts for Panoramic Images", Retrieved at <<http://ieeexplore.ieee.org/stamp/stamp.jsp?tp=&arnumber=5366117>>, In proceedings of 11th IEEE International Symposium on Multimedia, Dec. 14, 2009, pp. 6.

"International Search Report & Written Opinion for PCT Patent Application No. PCT/US2013/063340", Mailed Date: Feb. 12, 2014, Filed Date: Oct. 4, 2013, 9 Pages.

Murphy, P.K., "Survey of Image Restoration Techniques", A Technical Memorandum, Jul. 1988, 32 Pages.

Liepmann, T.W., "Wedged Plate Beam Splitter without Ghost Reflections", In Proceedings of Applied Optics, vol. 31, Issue 28, Oct. 1, 1992, pp. 5905-5906.

* cited by examiner

2nd Additional bounce

1st Additional bounce

DC response

Sub-structure due to diffraction of turning film (TF)

REDUCING GHOSTING AND OTHER IMAGE ARTIFACTS IN A WEDGE-BASED IMAGING SYSTEM

BACKGROUND

An optical wedge is a kind of prism that is shaped like a wedge and has a face extending from a narrow end to a thick end and transverse to a base, a window at the thick end orthogonal to the base and transverse to the face, and two sides orthogonal to the base, window and face. The face and window are the primary optical input and output, depending on whether the wedge is being used for projection or imaging. The window may be tilted with respect to or at an angle orthogonal to the bisector angle of the wedge. The wedge may be a single pass or double-pass wedge system, 'stingray' wedge system or 'blade' wedge system.

A wedge serves as an angle-space to position-space converter, because angular field-of-view (FOV) at the wedge thick-end window corresponds to position space across the wedge face. For imaging applications, rays are guided from the wedge face, bouncing off each subsequent opposing wedge surface (which adds twice the wedge angle for each bounce) until their angle-of-incidence is lower than that allowed by total internal reflectance (TIR). Light then escapes on the window at a point corresponding to the angle of input at the face. The escaping light is then collected by a camera lens that directs light to a camera sensor.

Such systems rely on the effect of total internal reflection (TIR) to guide light. However, the transition between TIR and non-TIR is not a pure transition, and a partial amount of light is accepted by the wedge, according to the Fresnel reflectivity curve, near the TIR transition angle. For imaging applications, the light from an object is significantly coupled into the wedge and the first bounce beyond TIR, and then is coupled into the wedge opposing face. However, at the same time, some portion of light from the same object location, having a slightly different angle, is allowed to bounce off an additional face before being coupled into the wedge. This portion of light causes a ghost image of the original object to appear to exist at a different angle within the camera field of view. There can be multiple ghost bounces. The first ghost can exhibit an intensity that typically has on order of 15% to 25% of the original image, while subsequent ghosts are substantially and progressively reduced. However, if the original image is saturated, even two or three ghost images can be visible in the resulting image captured using the wedge. One problem is that both the ghost direction and the ghost pitch changes with respect to position, primarily due to the change in thickness versus position in a wedge.

For the case of a double pass imaging wedge, such as a wedge 'blade', the thick end Fresnelated reflector may be curved so as to substantially collimate the guided light along wedge after being reflected by the thick-end reflector. Thus, ghosting may be primarily oriented along the wedge.

For the case of a 'stingray' imaging wedge, at least one face of the wedge is non-flat, having a profile which may typically be swept in a radial fashion at a point of origin, typically near the end window where a camera would be placed. Thus, ghosting may have a direction substantially radial from the origin, which would vary with respect to a two-dimensional position on the wedge face. While the ghosting direction may be substantially radial from the origin, the resulting distorted image from a vision system viewing into wedge window may also show such substantial radial direction nature of the ghosting. However, there may be additional slight curvature placed on the image due to lens distortion, such as barrel or pincushion distortion.

In addition to ghost images, other artifacts can arise in an image captured using wedge optics, due to quantifiable physical effects of the optical system. Such effects can arise from, for example, a diffuse layer, diffraction due to a turning film layer, and/or diffraction due to an LCD/display cell aperture array. Such artifacts include, but are not limited to, blurring.

In some wedge imaging systems, attempts have been made to reduce ghosting and blurring by using anti-reflective materials or a cladding layer or by an engineered surface having stand-off structures to form a cladding out of air. All of these solutions increase manufacturing cost and complexity. Further, anti-reflection coatings may be optimized for a given wavelength at a given high angle of incidence; however, optimizing for a range of wavelengths as well as a range of angles typically involves tradeoffs on at least a portion of the band of wavelengths or range of angles, which can limit maximum performance of the layer.

SUMMARY

This Summary is provided to introduce a selection of concepts in a simplified form that are further described below in the Detailed Description. This Summary is intended neither to identify key features or essential features of the claimed subject matter, nor to be used to limit the scope of the claimed subject matter.

A computational image processing filter processes an image from a wedge-based imaging system so as to reduce various artifacts, such as blurring and ghost images. By reducing the artifacts computationally instead of optically, manufacturing costs and complexity are reduced over prior solutions. In one implementation, to reduce ghost images, the computational image processing filter performs a two-dimensional transform to align the ghost image with a pixel grid defined by the wedge. The transformed image is then stretched using a nonlinear transform to make the ghost pitch versus position a constant. Next, an anti-ghost point spread filter is specified and deconvolved from the image. Finally, an inverse of the nonlinear mapping is applied, so as to transform the image back to an original orientation.

Thus, in one implementation the image is filtered based on presumed locations of ghost data. This filtering may include use of ghost mapping from ray tracing or physical optics describing ghost location. Such mapping or knowledge can be used in a segmented approach which divides the image into subregions in order to apply appropriate filtering based on physical description of ghosting at that location.

In another implementation, diffusion or blurring in the image caused by placement of a diffuser film above the wedge face is corrected by a deconvolution of the diffusion profile of the diffuser film. In another implementation, diffraction due to a turning film layer is corrected by a deconvolution of the diffraction pattern due to the turning film layer. In yet another implementation, diffraction due to a display panel placed above the wedge face is further corrected by a deconvolution of the diffraction pattern due to the cell array patterning of the display. The display panel includes an array of apertures which are at least partly transparent to infrared, and the wavelength of the infrared illumination light.

Thus, the wedge based imaging system includes one or more optical layers above a wedge and that introduces one or more artifacts and wherein the processing includes deconvolving the artifact from the image according to a point-spread function representing an effect of the optical layers on the image.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which such an artifact reduction filter can be implemented.

Figure 1:
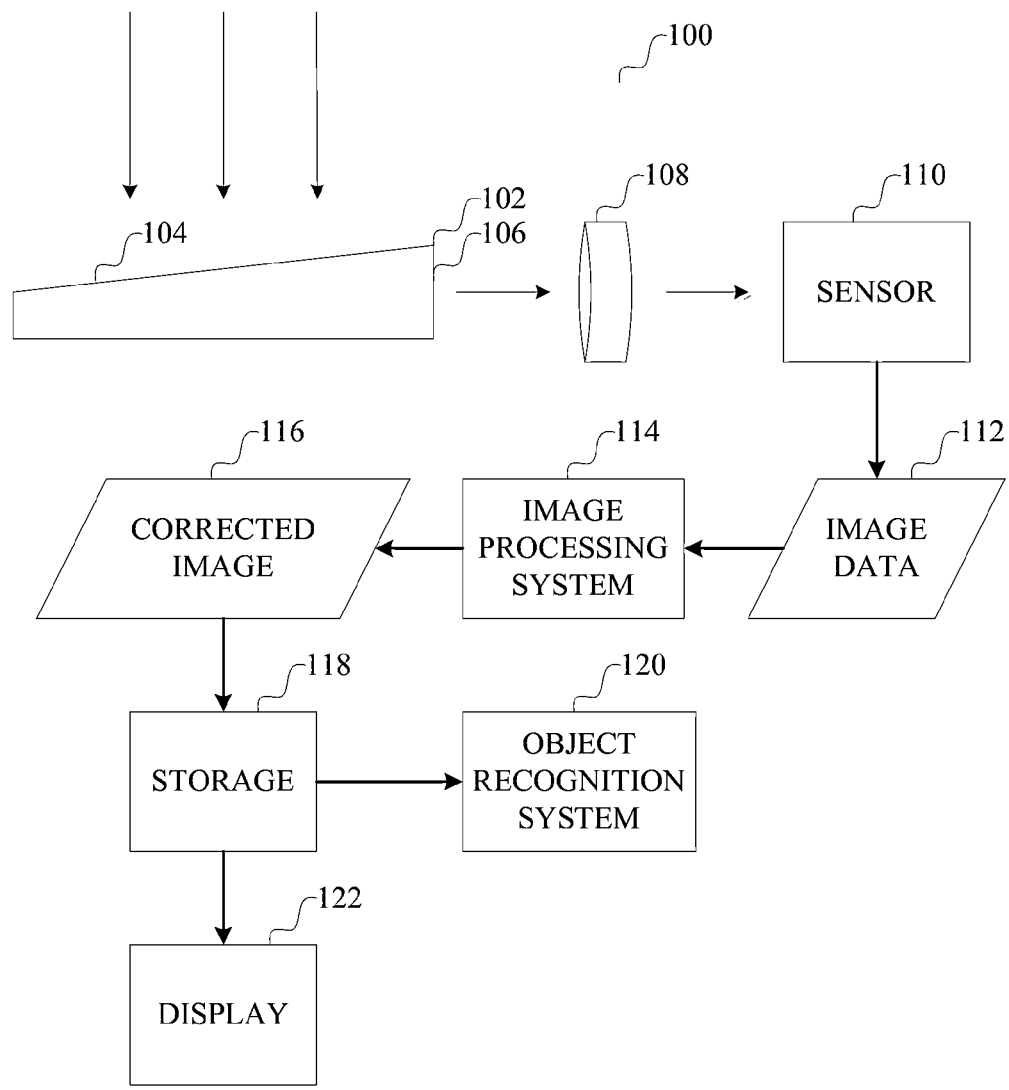
FIG. 1 is a block diagram of a wedge-based imaging system.

Referring to FIG. 1, an imaging system 100 includes a wedge 102 which collects light on a wedge face 104, which in turn is output on wedge window 106. Light emanating from the wedge window 106 is collected by a lens 108 and directed onto a sensor 110. The output of the sensor is image data 112 which is stored in memory (not shown) to be provided to an image processing system 114. The image processing system includes an anti-artifact filter, example implementations of which are described below.

The image processing system 114 can be implemented, for example, on a general purpose computer system programmed to implement image processing techniques. The image processing system also can be implemented, for example, using special purpose hardware that implements image processing techniques.

The imaging system 100 can be designed to implement any of a variety of imaging applications. An example is an imaging surface that is combined with a display, such as an LCD display. The imaging surface captures images of objects in front of the display. Such objects then can be subjected to various object recognition or other image processing operations. For example, a bar code (whether one-dimensional or two-dimensional, such as a quick response (QR) code) recognizer can be implemented by the imaging system 100. Other example applications include, but are not limited to, imaging objects placed on display surface such as finger touch events or tags, or objects identifiable via an affixed tag identifier, such that the surface is imaged in a substantially telecentric manner through an LCD panel, or other transparent panel such as transparent OLED, imaging substantially telecentrically through and beyond a transparent or semi-transparent display panel. Such a panel can be of small size, on order of a couple of inches diagonal, to larger sizes, on order of forty inches and larger. Another application is detecting gestures of hands performed in the volume of space above the display, both in horizontal form factors as well as vertical wall-mounted or vertically-mounted scenarios, as well as mobile device applications.

Accordingly, the image processing system 116 outputs into memory 120 a corrected image 118 in which any artifact, such as blurring or a ghost image, is substantially reduced. In turn, the corrected image can be provided from storage 120 for a variety of uses. The storage 120 can be any kind of memory or storage device. The uses of the corrected image, include, for example but not limited to, an object recognition system 122 or a display 124. The object recognition system, for example, can be used to recognize bar codes, gestures, objects and the like.

Given this context, example implementations of an anti-artifact filter will now be described in more detail in connection with FIGS. 2-10.

Referring to FIGS. 2-7 and 10, a general principal underlying an example implementation for reducing ghost images will first be described.

Figure 4:
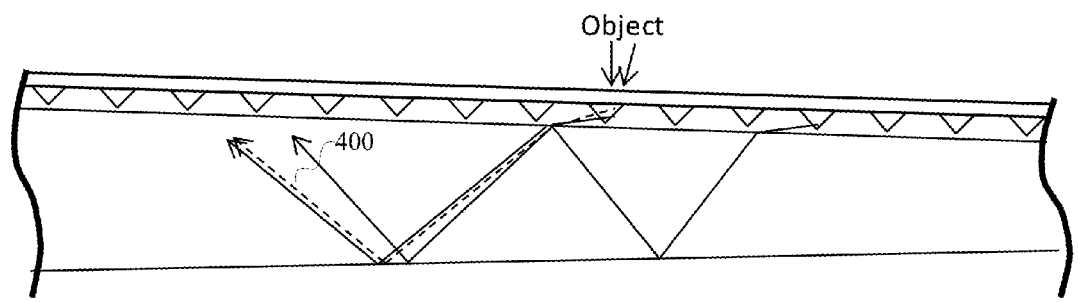
FIG. 4 is a diagram illustrating how ghost images arise from a wedge.
Figure 10:
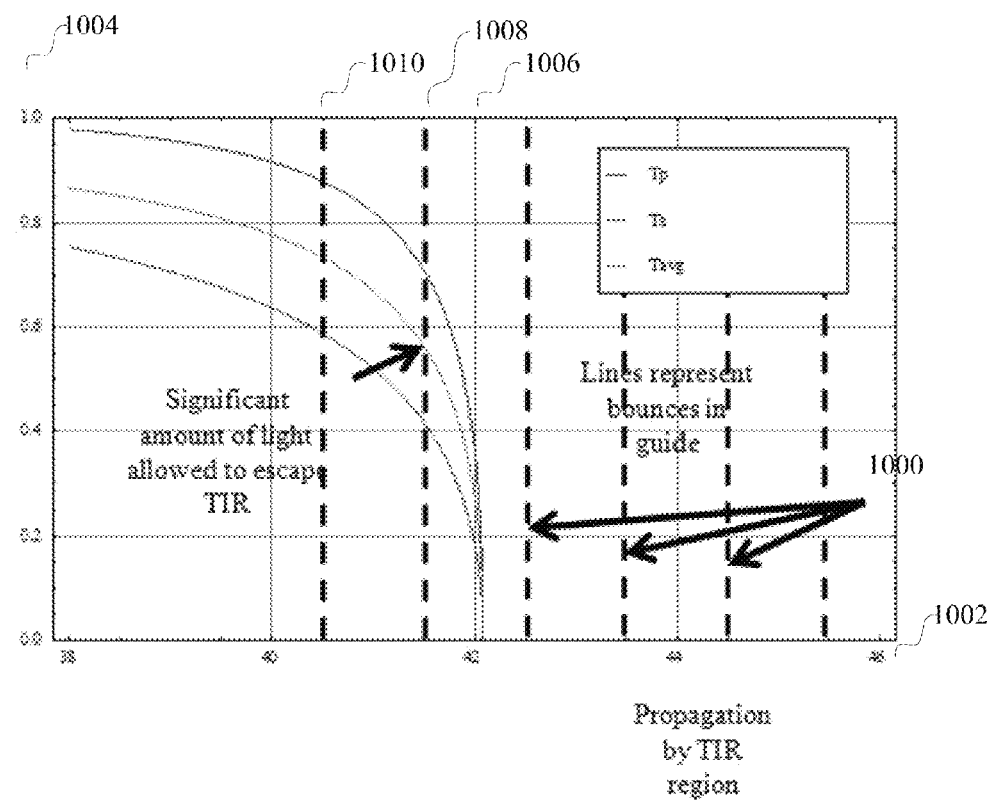
FIG. 10 is graph illustrating an amount of light transmission from an exit face with respect to the angle of the light in a medium, near and around the angle corresponding to total internal reflection.

In FIG. 4, light which escapes the wedge at the first bounce after the angle defining TIR is the light transmitted to form primary image content. However, because this first bounce is not binary, a portion of light (indicated by line 400) from an object appears to emanate from an angle that should have come from a different band, differing by one bounce, for each progressive ghost image. Thinner wedges can suffer from multiple ghosts having diminishing magnitude in intensity. This effect is due to the non-binary, analog cutoff, near the total internal reflection transition point (TIR), between TIR and transmitting through the wedge, as defined by the Fresnel transmission coefficient for the wedge media and the wedge angle, as shown in FIG. 10. FIG. 10 shows the fractional amount of light transmitted 1004 (on a scale of 0.0 to 1.0) as a function of the angle 1002 of the light in the media. This example is for a wedge having a wedge angle of 0.5 degrees. A light ray increase by twice the wedge angle for each bounce off the face opposing the exit face of the wedge as it approaches the escape angle. Thus, the lines 1000 represent the different angles of the light bouncing in the wedge. Lines 1006, 1008 and 1010 represent the primary image content, first ghost bounce and second ghost bounce, respectively. In this example, 55% of light from the first ghost bounce is transmitted but 45% is reflected, thus there may be a second ghost bounce (depending on the next Fresnel coefficient). Reduction in second ghost bounces can be achieved using large wedge angles, which results in heavier, thicker wedges. This effect is iterative; the full amount of light entering a given bounce is dictated by the fractional amount of light which reflected from previous bounce.

Although this analog cutoff is not binary, it is predictable and therefore can be mapped. In other words, it can be predicted that a ghost pixel arriving at one location is a ghost pixel and such image content should be placed at another location in the image.

Figure 5:
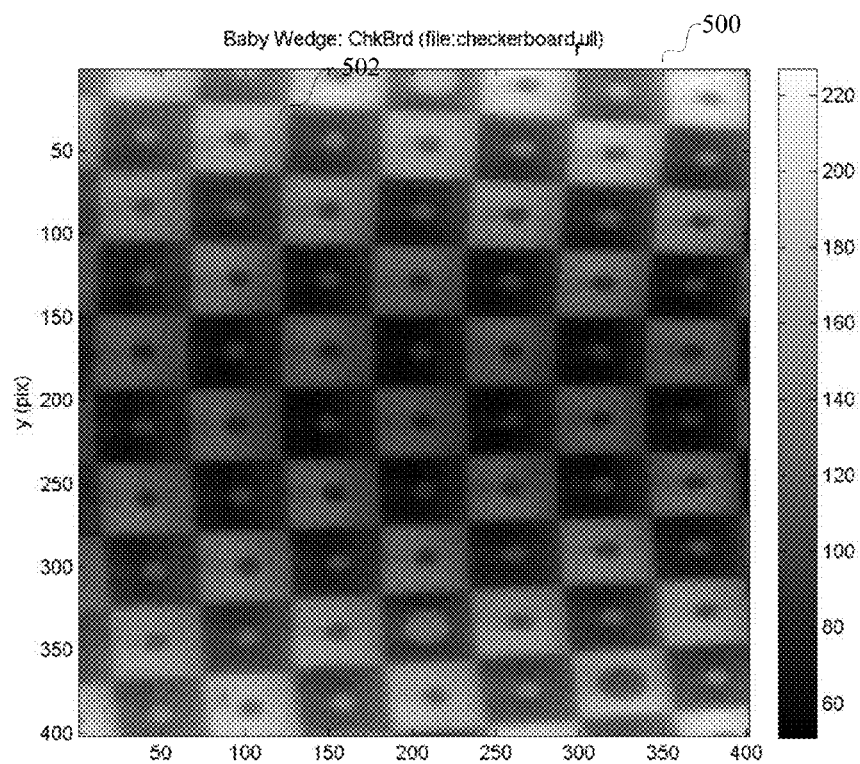
FIG. 5 is an example image having ghosting due to imaging through an imaging wedge.

In FIG. 5, an example image 500 is shown, wherein the actual image is a checkerboard pattern of squares, each with a contrasting circle in its center. Notably, in FIG. 5, a ghost image appears, such as at 502. The ghost artifacts are biased in one direction from real objects, in this image to the left. The wedge also imparts a nonlinear, relatively elliptical stretching to the objects as well.

Figure 6:
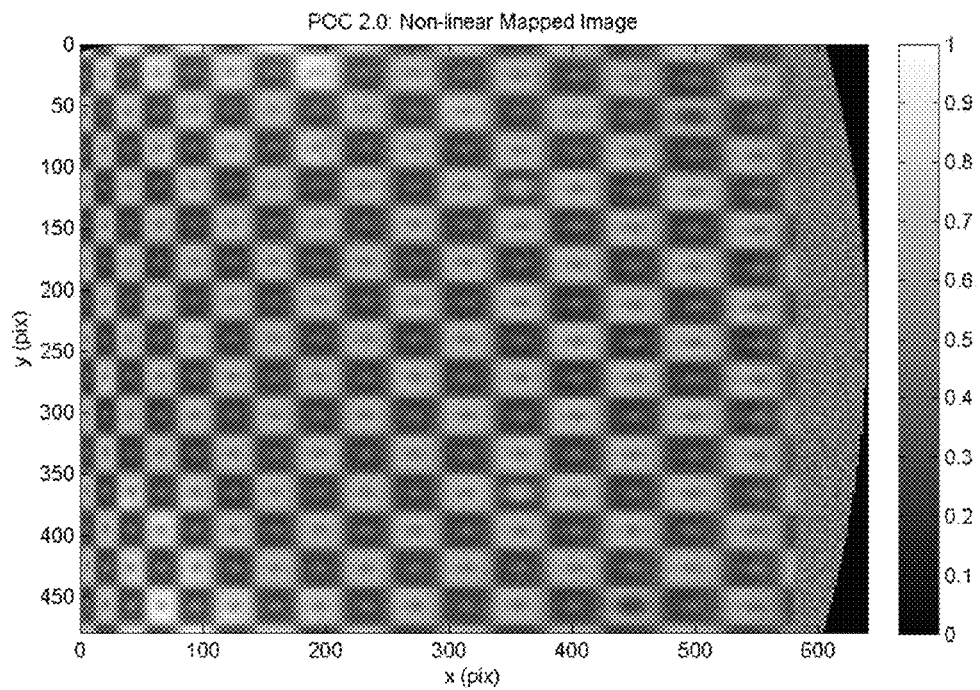
FIG. 6 is an example image after processing by nonlinear stretching.
Figure 7A:
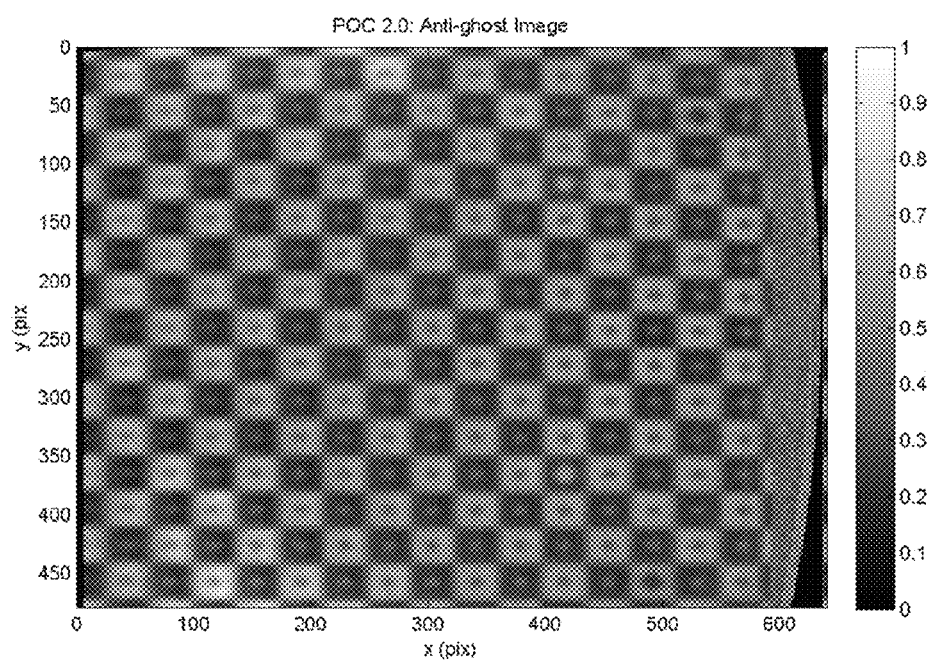
FIG. 7A is an example image after processing with an anti-ghost and anti-diffusion filter.
Figure 7B:
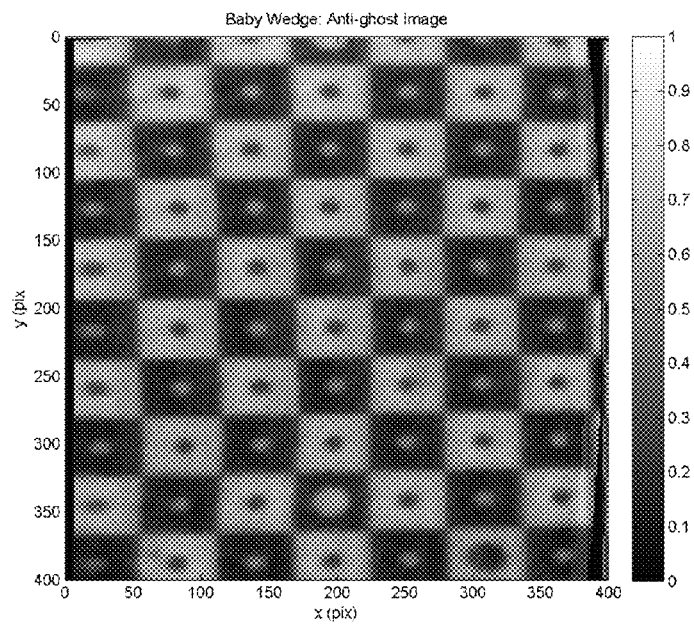
FIG. 7B is an example image after processing with an anti-ghost filter.

To remove the ghost image, the image is normalized, and then transformed to purposely deform the image in two dimensions so that ghost directionality as well as ghost pitch versus position is forced to be constant and directed along the dimensions of grid, such as shown in FIG. 6. A point spread function is applied to move the ghost pixels to the points from which they originated. Additional anti-diffusion filtering can also be applied. After the ghost image (and optionally diffusion artifacts) is removed, the spatial transform is reversed to generate the corrected image. The image with anti-ghosting and anti-diffusion applied is shown in FIG. 7A, whereas anti-ghosting is shown in FIG. 7B.

Figure 2:
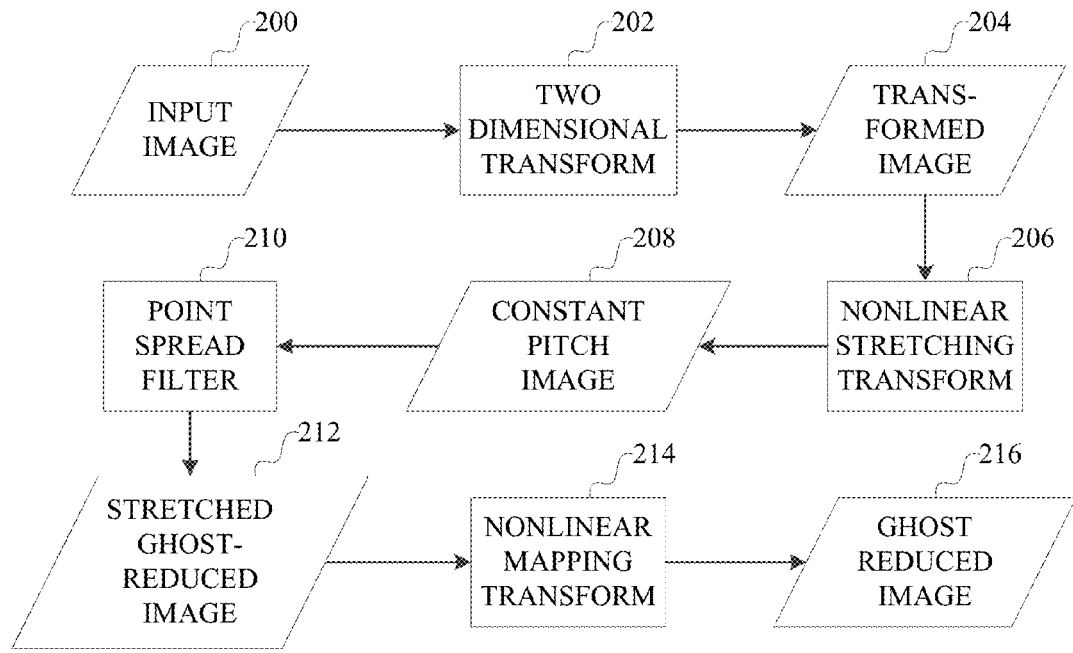
FIG. 2 is a data flow diagram illustrating an example implementation of an anti-ghost filter.

Referring now to FIG. 2, a data flow diagram of an example implementation of an anti-ghost filter will now be described. The input image 200 is an image provided by an output of a sensor (e.g., 110 in FIG. 1). The input image 200 is first processed by a two-dimensional transform 202 to produce a transformed image 204. This two-dimensional transform 202 aligns the ghost image with a pixel grid defined by the wedge. The transformed image 204 is input to a nonlinear stretching transform 206, which provides a constant pitch image 208. The nonlinear stretching transform 206 uses a nonlinear transform to make an image where the ghost pitch versus position is constant. Next, the constant pitch image is input to an anti-ghost point spread filter 210, to product a stretched, ghost-reduced image 212. Finally, the stretched, ghost-reduced image 212 is input to a nonlinear mapping transform 214, which applies an inverse of the nonlinear mappings previously applied to transform the image back to alignment with the original input image, so as to transform the image back to an original orientation, thus providing a final ghost-reduced image 216.

Figure 3:
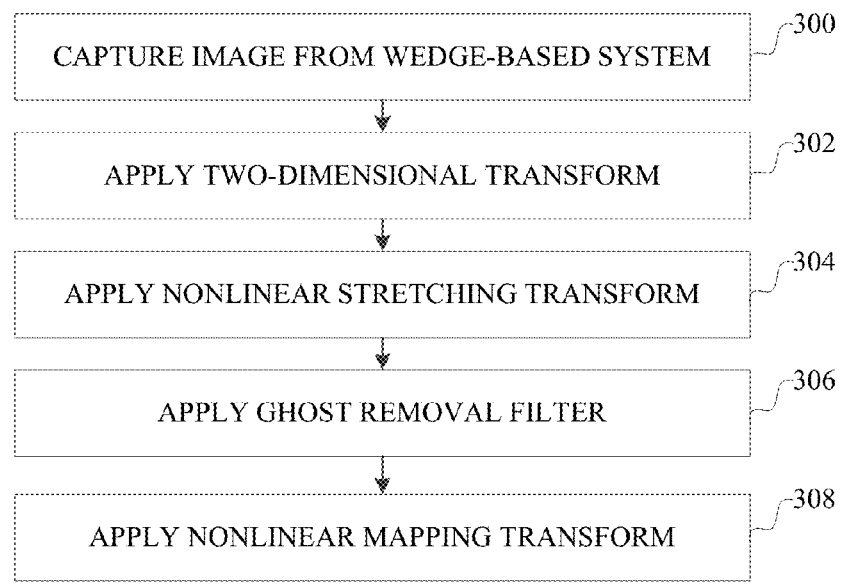
FIG. 3 is a flow chart illustrating operation of an example implementation of an anti-ghost filter.

Referring now to FIG. 3, a flowchart describing operation of an example implementation of an anti-ghost filter will now be described.

An image is captured 300 from a wedge-based system. The image is then subjected to a two-dimensional transform 302. Next, a stretching transform is applied 304. An anti-ghost removal process is applied 306. A nonlinear mapping transform that unstretches the image and places it back in its original grid is then applied 308. The resulting image is an image with the ghost artifacts substantially reduced.

An example implementation will now be described. Normalization can be achieved by subtracting the black level, or background, from both a white image as well as a given input image, then dividing the resulting latter difference by the former difference, yielding an image normalized in the range of 0 to 1. The resulting image may be scaled to any bit-level as desired, such as 8-bit. Minor fluctuations due to noise in the camera output may be corrected using error handling, to handle cases of divide by zero or negative values. The white image may be obtained by placing a flat-field white sheet on the display surface, which represents the typical maximum reflectivity that would be seen by the vision system. Normalization thus can be performed using Equation 1:

$$I_{norm} = \frac{(I_{in} - I_{bg})}{(I_{wht} - I_{bg})} \quad \text{(Equation 1)}$$

Next, the normalized image is mapped into a domain such that ghosting is aligned along a single dimension of the 2D image array. This mapping may be accomplished by (1) distortion correction involving a fit of known dot locations using a calibration board or screen, and calculation of all deviations from ideal, or (2) a mathematical mapping of the distortion caused by the wedge and camera optical system. The latter may be achieved by use of the following mathematical relations in Equation 2 through Equation 10 below. Rotation error representing rotation of the camera imager chip may be corrected by a rotation prior to distortion correction.

Figure 9:
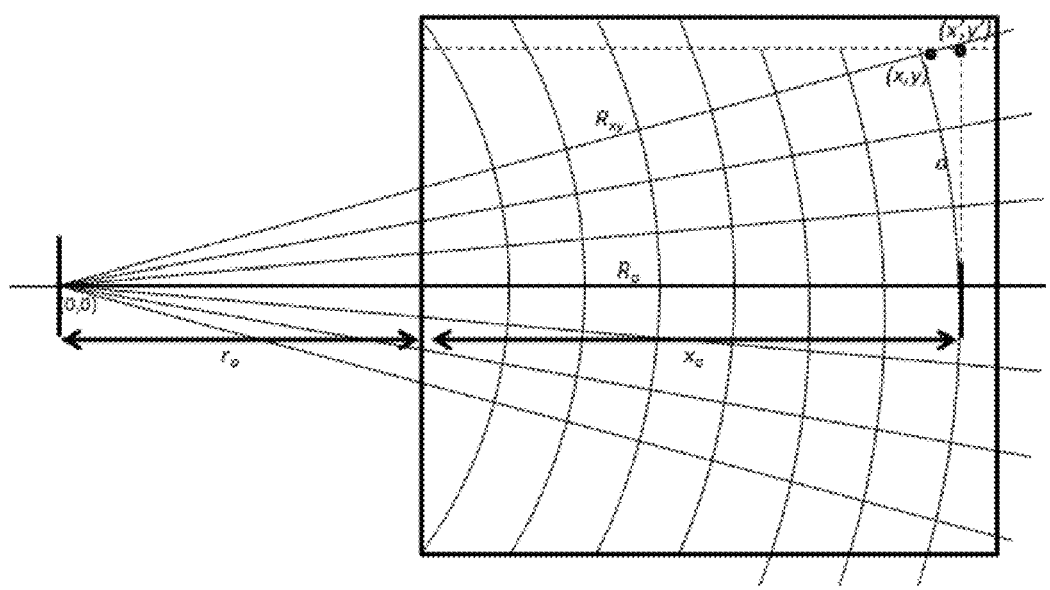
FIG. 9 is an illustration of image content prior to distortion correction, represented inside a rectangle, showing various parameters relative to said image content.

For distortion correction, as shown in FIG. 9, it is desired to map coordinates (x,y) into undistorted coordinates (x',y'), such that the arc length a becomes y' coordinate, whereas x' coordinate matches point of intersection of radius along x axis, thus:

$$x' = \sqrt{x^2 + y^2} = R_{xy} \quad \text{(Equation 2)}$$

$$y' = R_o \arctan\left(\frac{y}{x}\right) \quad \text{(Equation 3)}$$

Now x and y are defined in terms of the undistorted coordinate system:

$$x = \sqrt{x'^2 - y^2} \quad \text{(Equation 4)}$$

$$y = x\tan\left(\frac{y'}{R_o}\right) \quad \text{(Equation 5)}$$

Solving for x and y in terms of x' and y' provides:

$$x = \sqrt{\frac{x'^2}{\left(1 + \tan^2\left(\frac{y'}{R_O}\right)\right)}} = x'\cos\left(\frac{y'}{R_o}\right) \quad \text{(Equation 6)}$$

$$y = x\tan\left(\frac{y'}{R_o}\right) \quad \text{(Equation 7)}$$

$$= \sqrt{\frac{x'^2}{\left(1 + \tan^2\left(\frac{y'}{R_O}\right)\right)}} \tan\left(\frac{y'}{R_o}\right)$$

$$= x'\cos\left(\frac{y'}{R_O}\right)\tan\left(\frac{y'}{R_o}\right)$$

Apparent radius due to wedge optics is defined as follows:

$$R_o = r_x + x_o \quad \text{(Equation 8)}$$

Given this mapping relationship, it is more convenient to describe the mapping in terms of pixels from an image having, say, size 640×480 for performing the calculation. For the y' axis, the x' axis is set through the center of wedge image. If it is centered along vertical, it can be offset by half the pixels in the vertical dimension. However, any slight vertical offset due to camera misalignment is captured by an offset variable $r_y$. Also, any ellipticity 'stretch' due to the wedge imaging optic, is captured by an ellipticity factor $e_y$. The grid space for y' is thus the following:

$$y'_n = e_y\left(\left(n - \frac{N_y}{2}\right) + r_y\right) \quad \text{(Equation 9)}$$

For vertical pixel resolution $N_y=480$, vertical offset of origin $r_y$ (in pixels, ideal is 0), ellipticity factor $e_y$ and n=1, 2, 3, . . . n, where ellipticity factor may typically be in the 1.5 to 2.0 range for wedge optics, i.e. 1.7.

The x' array dimension is defined by the following:

$$x'_n = n + r_x \quad \text{(Equation 10)}$$

For horizontal pixel resolution $N_x=640$, horizontal offset of origin $r_x$ (in pixels), and n=1, 2, 3, . . . $N_x$, where offset of origin $r_x$ may typically be in the range of 1500 to 3500 pixels, e.g., 2500, depending on choice of wedge optics design, camera system field of view, and imager chip resolution.

To prepare for two dimensional interpolation, a mesh grid can be formed with these x' and y' linear arrays. Calculation of (x,y) coordinates for each element in the two dimensional array is then performed using equations for x and y in terms of x' and y'. After being calculated, the corresponding x and y elemental linear axis arrays can be calculated back to element space by:

$$x_{e_n(element)} = x_n - r_x \quad \text{(Equation 11)}$$

$$y_{e_n} = \frac{y_n}{e_y} + \frac{N_y}{2} - r_y \quad \text{(Equation 12)}$$

After the ghosting directionality has been mapped into one dimension, the variation of ghost lateral offset versus position across the length of the wedge face can be corrected using a non-linear stretch function, which is determined by the choice of wedge optic design. The function may be determined from ray tracing data for the wedge design, by determining bounce points along the wedge, or by mathematically determining bounce points and then fitting the bounce location relation to a curve. One example fit is the function as follows in Eq. 13, such that for a positional grid $x_{grid}$ from 0 to $N_x$, we have:

$$x_{grid}' = N_x x_{grid}^g \quad \text{(Equation 13)}$$

Such a fit may be used to create a linearly pre-distorted grid in the stretch dimension, such that the input data may then be interpolated onto the new grid, where the new grid may include previous $y_{grid}$ and stretched $x_{grid}$ in a 2D array of image data. This step maps the data onto a new grid such that the ghosting is not only aligned to one dimension, but the ghost offsets are consistent versus position across the grid along the ghosting dimension.

The point spread function (PSF) which is used to deconvolve the ghost from the image data is derived to represent the physical offset of ghost bounces, and may be carried out to any reasonable number of ghosts in series in order to diminish the impact of ghosting in the image. The PSF may be normalized to have a sum energy of unity.

An example anti-ghost PSF may be generated by the following example Matlab script in Table I:

TABLE I m = 51% where m represents per bounce spacing in pixels
PSF = zeros(1, 2 * m + 1) % create PSF of length 2 * m + 1
b2 = 0.05% set relative level of second ghost
b1 = 0.25% set relative level of first ghost
b0 = 1.0% set image DC content to unity
PSF(1) = b2/(b2 + b1 + b0) % for secondary ghost
PSF(m + 1) = b1/(b2 + b1 + b0) % for primary ghost
PSF(2 * m + 1) = b0/(b2 + b1 + b0) % for image content This example creates an anti-ghost PSF having an effective ghost spacing of 51 pixels in the non-linear distorted image, and includes correction for 2 subsequent ghost bounces due to a wedge angle in the range between 1 and 2 degrees. Using a PSF that corrects for even a single bounce can have significant impact on image correction, depending on the wedge angle of the wedge optic. The example above provides for a DC response, and first and second additional bounces, in a ratio of 1:0.25:0.05, for a moderately thin wedge design.

While this example assumes an integer multiple of pixels in the spacing of the ghosts, PSFs representing partial pixel placement of the ghosts may be generated by interpolation, as long as total sum energy in the PSF is kept constant, such that partially-filled neighboring pixels may represent positions within a pixel spacing. Upsampling the image data is another option, but can increase calculation time.

By deconvolving the PSF from the linearly distorted image, the ghosting is reduced in the image data, and the distortion is corrected by using an inverse function of the original one dimensional distorting function used to force all ghosting to have equal length.

One example inverse function is as follows:

$$x''_{grid} = \left(\frac{x'_{grid}}{N_x}\right)^{1/g} \quad \text{(Equation 14)}$$

The anti-ghost processed image data is then undistorted along the ghost dimension of the data, using an inverse function.

Typically, the ghosting in a wedge may be closely aligned with lines emanating from an origin at the radial distance $R_0$; however, the elliptical distortion correction also has capacity to account for such optic distortions added by a lens system such as a barrel or pincushion, such that it may be desirable to use a final correction which is not exactly the same as a mapping that would correct distortion of image alone. An example of such a case is a wedge-based image which has ghosting not exactly aligned to the directions of the lines emanating from point origin at distance $R_0$. In such a case, distortion correction of the image and distortion correction into a ghost domain, where ghosting is aligned to one dimension in data array, may differ, such that the final image is obtained by either (1) inverse function of ghost domain plus additional distortion correction into spatially-corrected domain, or (2) single inverse function direct to spatially-corrected domain, both of which may be achieved by use of functions with similar form, but different parameters.

Other artifacts in addition to ghost images can be introduced by the various parts of the optical system, such as a turning film, diffuse layer or cell array in a transparent display, such as an LCD display or OLED display.

Figure 11A:
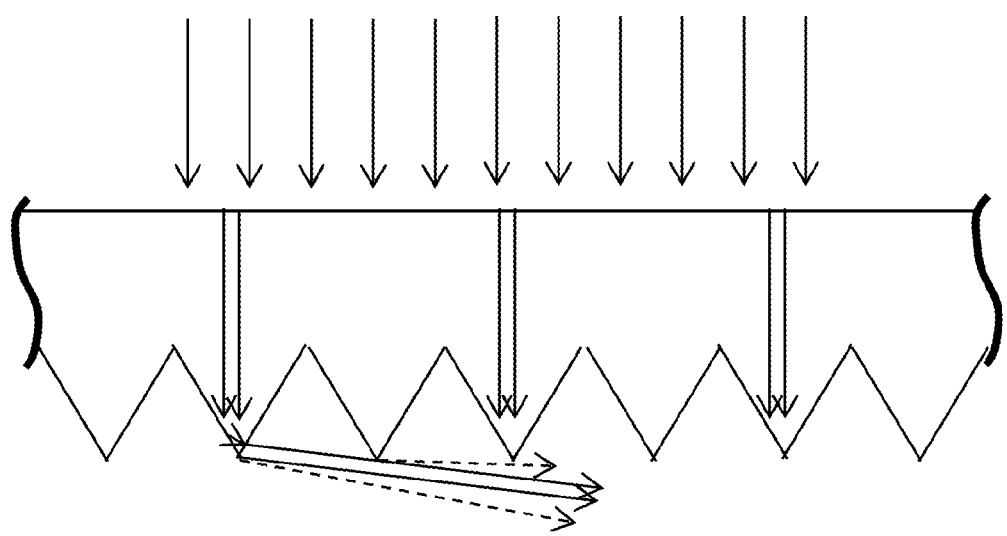
FIG. 11A illustrates an example structure of a turning film, indicating locations which contribute to diffraction, due to apparent edge effects.
Figure 11B:
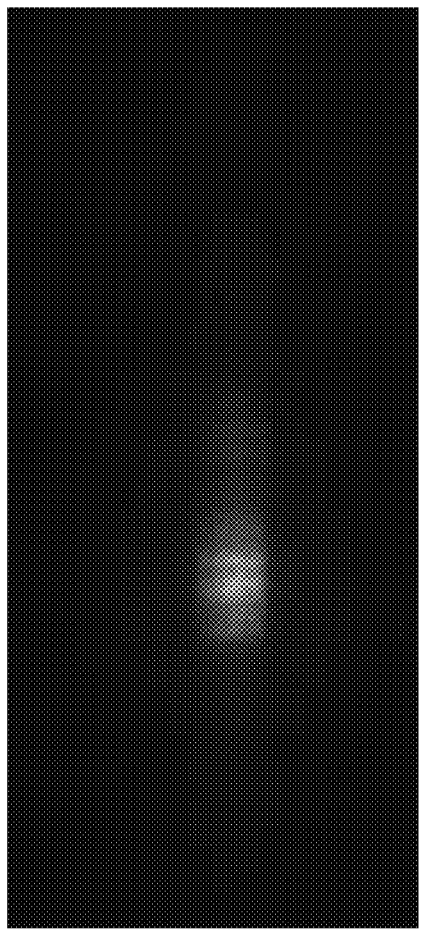
FIG. 11B shows an image of a single beam of light as imaged through an imaging wedge, such that the primary spot image is seen with additional effects of diffraction due to turning film, along with a lower intensity first ghost due to first additional bounce, and a further lower intensity second ghost due to subsequent second bounce, showing impact on input light.
Figure 11B:
Figure 11C:
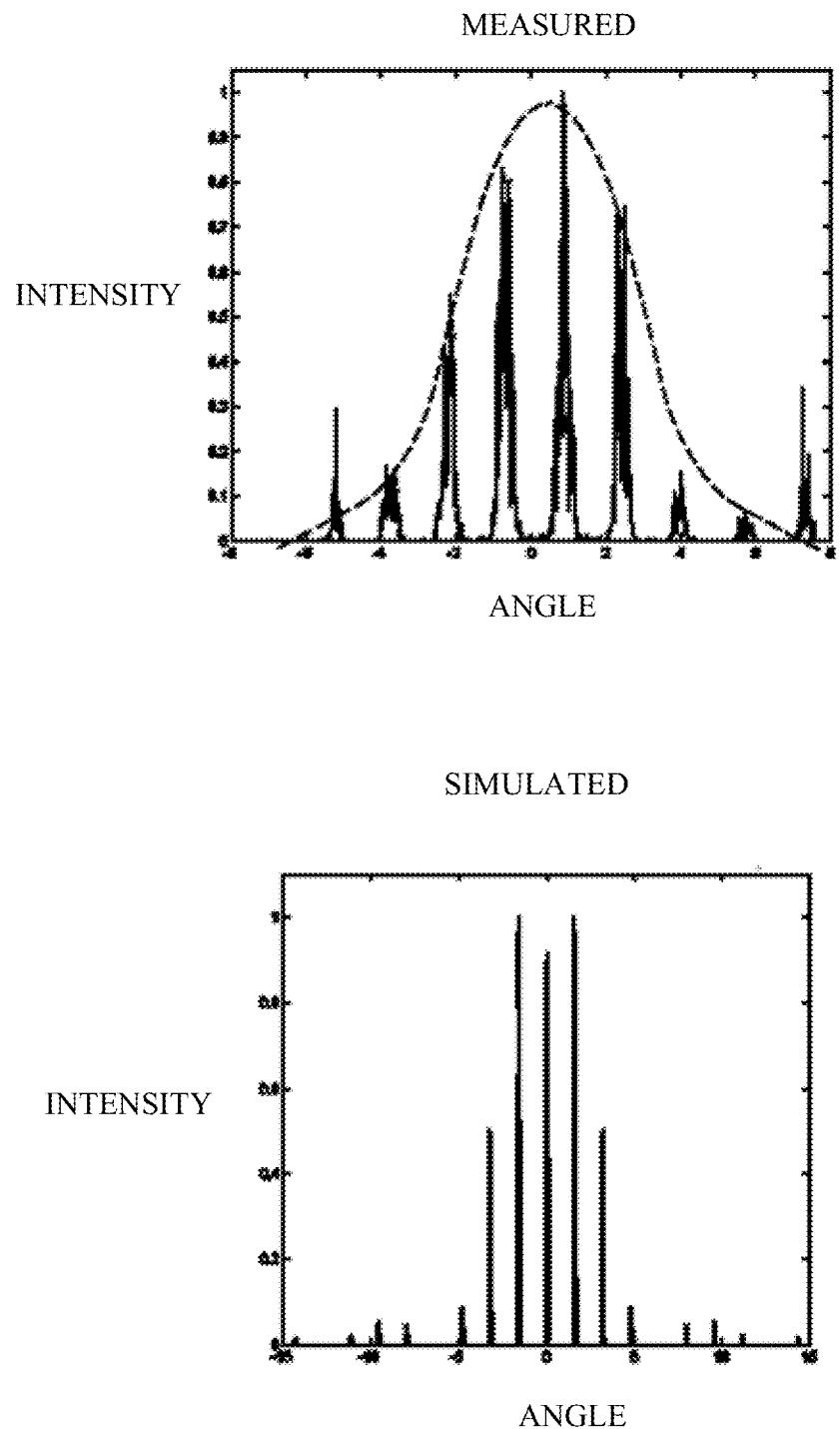
FIG. 11C illustrates a measured and a simulated diffraction pattern due to an example turning film.

Typically, a turning film is used to turn the light exiting the wedge at a high angle, more close to normal. A turning film typically has a structure such as shown in FIG. 11A. Such a turning film may exhibit diffraction effects on the image content, for cases where it is desired to image through a distance substantially beyond the wedge exit face. Light having a limited narrow wavelength band may interact with the turning film pitch to form two laterally offset diffraction lobes, in addition to the $0^{th}$ order. The diffraction pattern due to the turning film interacting with a single beam of laser light, shown in FIG. 11B, includes an envelope which indicates an overall profile of the diffraction as well as interference due to the periodic nature of turning film. Further, FIG. 11B shows an image of this single beam of light as imaged through an imaging wedge, such that the primary spot image is seen with additional effects of diffraction due to turning film, along with a lower intensity first ghost due to first additional bounce, and a further lower intensity second ghost due to subsequent second bounce, showing impact on input light. Use of LED illumination, compared to laser illumination, allows for more broadened spectral width, thus more overlap in diffraction orders, and may result in a more curved profile in the PSF compared to use of narrow wavelength band sources. Both measured and simulated responses of the turning film in response to light are shown in FIG. 11C. The simulation shown in FIG. 11C treats the turning film as an array of slits through which the light propagates. Slight differences may be caused by the fact that, in practice, the light is subject to two edge clipping functions at two slightly different distances along propagation, the first at the tip of the current facet and the next at the tip of the neighboring facet after turning, separated by a pitch spacing, when actually propagating through the turning film. For incoherent sources such as infrared LEDs, the interference is not as substantial, although there may be partial coherence due to spatial coherence due to the narrow angles being accepted through the imaging wedge, and the envelope is the significant artifact which may be desirable to remove from image. In such a scenario, a PSF representing the physical optics of diffraction appropriately scaled to the image content may be formed. If the LEDs are fairly narrow band in wavelength, and the turning film pitch is relatively moderate, then a PSF may include a combination of orders as well as broadening, such that the diffraction envelope is partially formed by the PSF. Thus the PSF may include many spikes having an envelope, or may have broadened orders which do not overlap but still exhibit an envelope, or may have broadened orders which do overlap and form the diffraction envelope itself.

An example implementation can be made using the following Matlab script in Table II.

TABLE II m = 5
m0 = 1.0% set relative level of $0^{th}$ order
m1 = 0.7% set relative level of +/−$1^{st}$ lobe
m0v = m0/(m0 + m1 + m1) % normalize relative energy of $0^{th}$ order in PSF
m1v = m1/(m0 + m1 + m1) % normalize relative energy of +/−$1^{st}$ lobe in PSF
PSF = zeros(1, 2 * m + 1)
PSF(1) = m1v % set −1 lobe
PSF(m + 1) = m0v % set 0 order
PSF(2 * m + 1) = m1v % set + 1 lobe The case above illustrates a turning film having diffraction orders separated by 5 pixels, and a factor of 70% relative energy in the +1, and −1 peak lobes compared to the center diffraction order, within the diffraction envelope of the diffraction pattern. Such a scenario is for a turning film which exhibits a diffraction pattern such that the +/−1 orders are approximately 70% of the intensity to the $0^{th}$ order for a given spacing between turning facets and given facet angles. If a flat gap exists between turning facets, the pitch is increased, as well as the effective width of apparent aperture through which the light passes. As apparent aperture increases, the diffraction envelope decreases in angular width. Also, the diffraction order spacing (spikes within envelope) is dictated by interference of diffraction envelopes of multiple neighboring apparent apertures, which is dictated by the spacing of the turning facets. A turning film having a given pitch or spacing of turning facets, but having no flat gaps between turning facets, primarily exhibits a diffraction pattern having similar angular spacing between diffraction orders, as well as similar diffraction envelope. However, if every other facet is removed, then the pitch increases as well as the apparent aperture. Thus, angular spacing between diffraction orders decreases and diffraction envelope angular width decreases. An additional factor influencing the diffraction pattern is the pointing angle and effective angular width of the high angle of incidence light being turned by the turning film. An increase in this peak pointing angle can imply a larger apparent aperture width, and thus smaller diffraction envelope. By noting these three factors, various combinations of diffraction envelope size and diffraction order spacing are possible. The PSF spread for diffraction due to the turning film increases as the separation distance between turning film and imaged surface increases. This increase occurs because the diffraction emanates in angle space, such that the turning film filter is particularly useful for image improvement in architectures where there is a z separation distance between the turning film, placed on top of the wedge face, and the surface to be imaged. This separation can occur due to a panel and/or protective cover layer being placed between turning film layer and the surface to be imaged. In such a case, the impact of the turning film on the image content may be assessed due to the separation distance and the known angular emanation of the diffraction pattern due to turning film. Because the diffraction includes an effect due to interaction with a range of wavelengths, the angular width of each diffraction order is broadened compared to a simulation which may include a given wavelength. Further, as the turning film pitch becomes large, the angular spacing of diffraction orders reduces, and may allow partial or full overlap of the diffraction orders when considering a range of wavelengths included in the spectral width of the illumination source, such that the PSF desired for filtering may become a profile with respect to pixels across the PSF, instead of spikes of discrete orders at a given pixel spacing.

For a fundamental wedge optic vision system, both ghosting and diffraction artifacts from turning film may be software or firmware filtered as described above.

Turning now to wedge vision systems used to see through a transparent display, such as an LCD or transparent OLED display, it may be desirable to further correct artifacts in the image caused by the diffraction of the RGB aperture cell array within the display panel. Incoherent illumination light, having a narrow wavelength range, transmitted through an array of display apertures, experiences diffraction, such that the resulting diffraction pattern is a diffraction envelope, equal or substantially similar to a sinc function, defined by the width of apertures and having diffraction orders within the envelope defined by interference of neighboring apertures or cells. Diffraction and interference effects of a narrow band of light interacting with an array of apertures may be calculated based on 2D aperture shape and spacing and layout, as well as measured.

By using knowledge of the 2D layout of the cell apertures of the display, a 2D diffraction pattern may be calculated in angle space, which represents the diffraction PSF convolved with the image. By determining this diffraction pattern, the diffraction pattern blurring artifact can be removed from the image data. The diffraction pattern can be determined, for example, either by calculation or measurement, such as by imaging or scanning the pattern in angle space through use of a pseudo-collimated incoherent source, then deconvolving the PSF from the image.

Some LCD panels exhibit a substantially rectilinear array of RGB apertures, while others may exhibit chevron shapes or other shaped apertures. Thus, the assessed diffraction envelope due to the display panel is used to correct blurring caused by diffraction of image light with panel.

Artifacts also can be induced by diffuse layers in an optical system. For example, a matte surface relief layer may be used on either side of a display panel to either (1) provide an anti-glare layer on outside surface of display, or (2) improve z response of touch detection. In such a case, the physical optics response of the film or layer, such as a diffuse angular character, may be determined by calculation of an exit pattern by ray-tracing or beam propagation through the known surface topography. Alternatively, a direct measurement of the angular exit profile of the layer may be made, to serve as a PSF representing the angular exit profile of the layer.

All diffusers are not equal, as some volume diffusers may correlate to a Henyey-Greenstein profile, or other fit approximation of volume scatterers, while some random surface reliefs, such as Luminit LSD films, may be near-gaussian. Regardless, the diffuse profile may be assessed through measurement of the exit profile, or by ray-tracing or propagation through the known surface topography.

After the PSF is determined, the blurring due to such diffuse layers may be deconvolved from the image content. Because the effect physically takes place at the real spatial domain above the wedge main face, such a filter is applied after the image content has been corrected to be in the exit face domain, i.e. rectilinearly corrected in 2D to represent real object domain at display surface. By using knowledge of the diffuse angular exit profile of the diffuser, a PSF may be generated then used to deconvolve blur artifacts in image due to the presence of the diffuse, or matte, layer. A typical surface relief diffuser may exhibit radial symmetry, or may exhibit an elliptical exit cone profile in angle space, depending on design. Other exit profiles are possible as well, such as top-hat round or rectilinear. Thus, the assessed angular exit profile, scaled to pixels domain in the undistorted image, is used to correct for blurring caused by such diffuse layer.

Having now described an example implementation, a computing environment in which such a system is designed to operate will now be described. The following description is intended to provide a brief, general description of a suitable computing environment in which this system can be implemented. The system can be implemented with numerous general purpose or special purpose computing hardware configurations. Examples of well known computing devices that may be suitable include, but are not limited to, personal computers, server computers, hand-held or laptop devices (for example, media players, notebook or tablet or slate computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, computers with multi-touch input devices, and the like.

Figure 8:
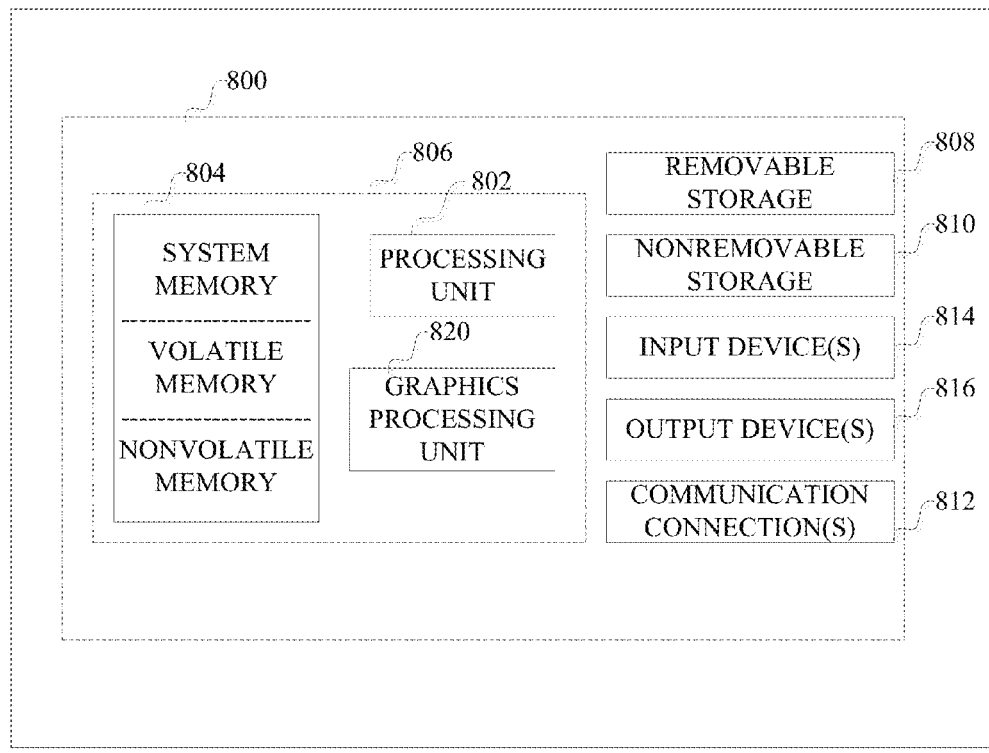
FIG. 8 is a block diagram of an example computing device in which such a system can be implemented.

FIG. 8 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 8, an example computing environment includes a computing machine, such as computing machine 800. In its most basic configuration, computing machine 800 typically includes at least one processing unit 802 and memory 804. The computing device may include multiple processing units and/or additional co-processing units such as graphics processing unit 820. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, computing machine 800 may also have additional features/functionality. For example, computing machine 800 may also include additional storage (removable and/or non-removable) including, but not limited to, magnetic or optical disks or tape. Such additional storage is illustrated in FIG. 8 by removable storage 808 and non-removable storage 810. Computer storage media includes volatile and nonvolatile, removable and non-removable media implemented in any method or technology for storage of information such as computer program instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 800. Any such computer storage media may be part of computing machine 800.

Computing machine 800 may also contain communications connection(s) 812 that allow the device to communicate with other devices. Communications connection(s) 812 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 800 may have various input device(s) 814 such as a keyboard, mouse, pen, camera, touch input device, and so on. Output device(s) 816 such as a display, speakers, a printer, and so on may also be included. All of these devices are well known in the art and need not be discussed at length here.

The input and output devices can be part of a natural user interface (NUI). NUI may be defined as any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence. Example categories of NUI technologies include, but are not limited to, touch sensitive displays, voice and speech recognition, intention and goal understanding, motion gesture detection using depth cameras (such as stereoscopic camera systems, infrared camera systems, RGB camera systems and combinations of these), motion gesture detection using accelerometers, gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

Such a system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A process comprising:
    receiving an image from a sensor into memory of the computer, wherein the sensor is configured to receive output light from a window of an optical wedge and output the image representative of the output light, wherein the optical wedge comprises a face configured to receive light from objects and the window configured to output light representative of the objects;
    processing the image with a processor of the computer so as to substantially reduce ghost image data by applying a filter that reverses optical effects of the optical wedge which generate the ghost image data in a wedge-based imaging system by moving ghost pixels from points in the image to points from which the ghost pixels originated; and
    outputting the processed image to the memory of the computer.

2. The process of claim 1, wherein outputting comprises outputting the processed image for access by an object processing system to identify one or more objects in the image.

3. The process of claim 1, wherein the wedge based imaging system includes one or more optical layers above the optical wedge which introduces one or more artifacts and wherein processing of the image includes deconvolving the artifact from the image according to a point-spread function representing an effect of the optical layers on the image.

4. The process of claim 1, wherein processing the image comprises:
    applying a two-dimensional transform to the image to align the ghost image data with a pixel grid defined by the optical wedge.

5. The process of claim 4, wherein processing the image further comprises:
    applying a point-spread filter to the transformed image to substantially remove the ghost image data from the transformed image.

6. The process of claim 5, wherein processing the image further comprises:
    applying a transform to the transformed image with the ghost image data substantially removed so as to transform the image back to an original orientation.

7. The process of claim 6, wherein the wedge based imaging system includes one or more optical layers above the optical wedge which introduces one or more artifacts and wherein processing the image includes deconvolving the artifact from the image according to a point-spread function representing an effect of the optical layers on the image.

8. An article of manufacture comprising:
    a computer storage medium comprising a memory device or a storage device;
    computer program instructions stored on the computer storage medium which, when processed by a processor of a computer, instruct the computer to perform a process comprising:
    controlling a wedge-based imaging system connected to the computer to capture an image, the wedge-based imaging system comprising an optical wedge and a sensor, wherein the optical wedge comprises a face configured to receive light from objects and a window configured to output light representative of the objects, wherein the sensor is configured to receive the output light from the window of the wedge and output the image to the computer, the image being representative of the output light from the window of the wedge;

receiving the image from the sensor into memory of the computer;

processing the image with a processor of the computer so as to substantially reduce ghost image data by applying a filter that reverses optical effects of the optical wedge which generate the ghost image data in the wedge-based imaging system by moving ghost pixels from points in the image to points from which the ghost pixels originated; and outputting the processed image to the memory of the computer.

9. The article of manufacture of claim 8, wherein outputting comprises outputting the processed image for access by an object processing system to identify one or more objects in the image.

10. The article of manufacture of claim 8, wherein the wedge based imaging system includes one or more optical layers above the optical wedge which introduces one or more artifacts and wherein processing the image includes deconvolving the artifact from the image according to a point-spread function representing an effect of the optical layers on the image.

11. The article of manufacture of claim 8, wherein processing the image comprises:
applying a two-dimensional transform to the image to align the ghost image data with a pixel grid defined by the optical wedge.

12. The article of manufacture of claim 11, wherein processing the image further comprises:
applying a point-spread filter to the transformed image to substantially remove the ghost image data from the transformed image.

13. The article of manufacture of claim 12, wherein processing the image further comprises:
applying a transform to the transformed image with the ghost image data substantially removed so as to transform the image back to an original orientation.

14. The article of manufacture of claim 8, wherein computationally reversing the optical effects of the wedge-based imaging system further comprises filtering the image based on presumed locations of ghost data generated by the optical wedge.

15. A wedge-based imaging system, comprising:
an optical wedge having a face configured to receive light from objects and a window configured to output light representative of the objects;
a sensor configured to receive the output light from the window of the wedge and output image data representative of the output light; and
a computational image processing system having an input for receiving the image data from the sensor and an output providing the image data with artifacts substantially reduced by applying a filter that reverses optical effects of the optical wedge which generate the ghost image data in the wedge-based imaging system by moving ghost pixels from points in the image to points from which the ghost pixels originated.

16. The wedge-based imaging system of claim 15, wherein outputting comprises outputting the image for access by an object processing system to identify one or more objects in the image.

17. The wedge-based imaging system of claim 15, wherein outputting comprises outputting the image for display on a display.

18. The wedge-based imaging system of claim 15, wherein processing the image comprises:
applying a two-dimensional transform to the image data to align ghost image data by position.

19. The wedge-based imaging system of claim 18, wherein processing the image further comprises:
applying a point-spread filter to the transformed image to substantially remove ghost data from the transformed image.

20. The wedge-based imaging system of claim 19, wherein processing the image further comprises applying a transform to the transformed image with the ghost data substantially removed so as to transform the image back to an original orientation.

21. The wedge-based imaging system of claim 19, wherein processing the image further comprises applying a transform to the transformed image with the ghost data substantially removed so as to transform the image back to alignment with the original input image.

22. The wedge-based imaging system of claim 21, further comprising one or more optical layers above the optical wedge and that introduces one or more artifacts, and wherein the processing includes deconvolving the one or more artifacts from the image according to a point-spread function representing an effect of the optical layers on the image.

23. The wedge-based imaging system of claim 19, wherein processing the image further comprises applying a transform to the transformed image with the ghost data substantially removed so as to transform the image back in its original grid.

24. The wedge-based imaging system of claim 15, wherein processing the image further comprises filtering the image based on presumed locations of ghost data.

25. The wedge-based imaging system of claim 15, further comprising one or more optical layers above the optical wedge and that introduces one or more artifacts, and wherein the processing includes deconvolving the one or more artifacts from the image according to a point-spread function representing an effect of the optical layers on the image.

* * * * *